United States Patent
Grant et al.

(10) Patent No.: US 6,719,238 B1
(45) Date of Patent: Apr. 13, 2004

(54) HIGH SPEED TAPE PACKING

(75) Inventors: John P. Grant, Sacramento, CA (US); William S. Oakley, Burlingame, CA (US); Thomas P. Frangesh, Campbell, CA (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/882,669

(22) Filed: Jun. 15, 2001

Related U.S. Application Data

(63) Continuation of application No. PCT/US98/26910, filed on Dec. 17, 1998.

(51) Int. Cl.$^7$ .............................................. B65H 23/04
(52) U.S. Cl. .................................................... 242/548.4
(58) Field of Search ................................. 242/547, 548, 242/548.1, 548.2, 548.3, 548.4, 614, 908

(56) References Cited

U.S. PATENT DOCUMENTS

| | | | |
|---|---|---|---|
| 2,529,501 A | 11/1950 | Johnston | |
| 3,342,435 A | 9/1967 | Gelardi et al. | |
| 3,399,845 A | 9/1968 | Krtous et al. | |
| 3,539,130 A | 11/1970 | Winkler et al. | |
| 3,556,435 A | 1/1971 | Wangerin | |
| 3,620,477 A | 11/1971 | Penn | |
| 3,627,230 A | 12/1971 | Wangerin | |
| 3,749,328 A | 7/1973 | Dusenbery | |
| 3,768,750 A | 10/1973 | Menary | |
| 3,819,124 A | 6/1974 | Marks et al. | |
| 3,840,894 A | 10/1974 | Arseneault | |
| 3,856,228 A | 12/1974 | Hosono et al. | |
| 3,961,369 A | 6/1976 | Baumann et al. | |
| 4,564,411 A | 1/1986 | Holzer et al. | |
| 4,778,119 A | 10/1988 | Yamazaki et al. | |
| 4,789,110 A | 12/1988 | Sakaguchi et al. | |
| 4,842,210 A * | 6/1989 | Kubota et al. ............ | 242/548.4 |
| 5,149,005 A | 9/1992 | Takagi et al. | |
| 5,155,639 A | 10/1992 | Platter et al. | |
| 5,474,253 A | 12/1995 | Kasetty et al. | |
| 5,533,690 A | 7/1996 | Kline et al. | |
| 5,547,146 A * | 8/1996 | Kita ........................... | 242/548.4 |
| 5,597,132 A | 1/1997 | Schlatter et al. | |
| 5,699,973 A | 12/1997 | Nakane et al. | |
| 5,777,823 A | 7/1998 | Gavit | |
| 5,803,388 A | 9/1998 | Saliba et al. | |
| 5,829,712 A | 11/1998 | Morita | |
| 5,865,389 A * | 2/1999 | Gonzales .................. | 242/548.4 |
| 6,045,086 A * | 4/2000 | Jeans ....................... | 242/548.3 |
| 6,450,438 B1 * | 9/2002 | McAllister et al. ....... | 242/548.3 |

FOREIGN PATENT DOCUMENTS

| | | |
|---|---|---|
| EP | 0 504 858 A2 | 9/1992 |
| GB | 738542 | 10/1955 |
| JP | 56-113643 | 9/1981 |

OTHER PUBLICATIONS

Supplementary European Search Report for European Patent Application No. 98965406.6, mailed Aug. 7, 2002.

* cited by examiner

*Primary Examiner*—William A. Rivera
(74) *Attorney, Agent, or Firm*—Eric D. Levinson

(57) ABSTRACT

Tapes (13), such as magnetic, optic and other recording tapes, and many other kinds of tapes having opposite edges (14,15), are wound into an increasing tape pack (16) about an axis of rotation (18) by floating substantially each newly arriving tape winding (113) on a fluid film (19) on the increasing tape pack. Opposite edges of substantially each new winding of the tape are continuously aligned for a number of turns (23) with corresponding edges of substantially all preceding windings of tape in the increasing tape pack with the aid of that fluid film. Increments of that fluid film between the turns are gradually diminished to zero until each leading turn of such number of turns has become locked to a remainder of the tape pack. Resulting packs (16) of wound tape are substantially fluid-free and co-planar along opposite radial planes (21,22) of the tape pack.

45 Claims, 9 Drawing Sheets

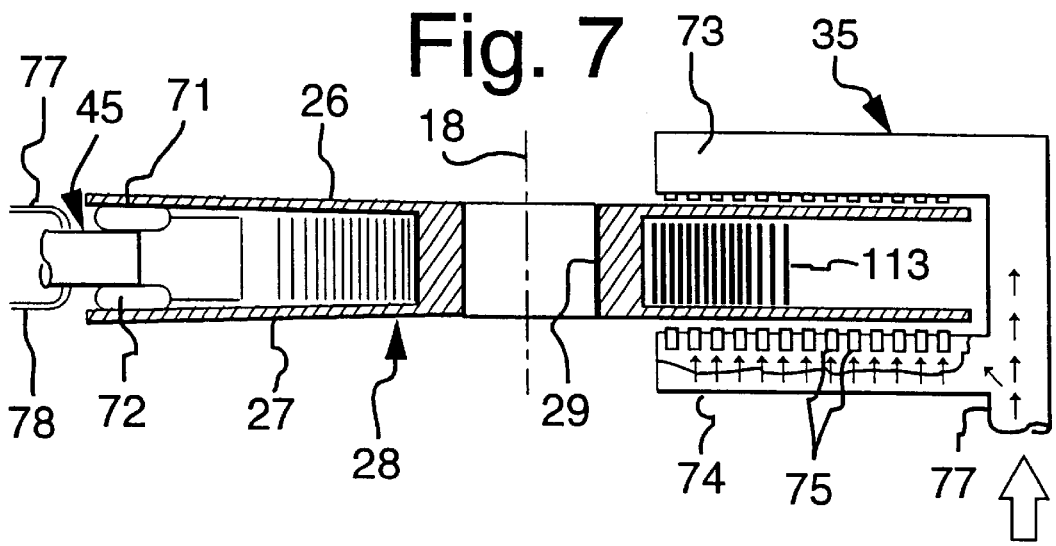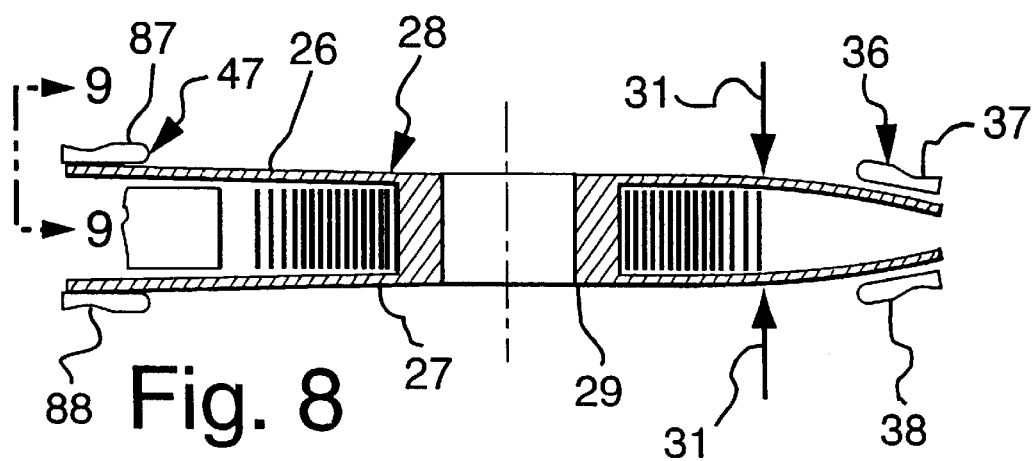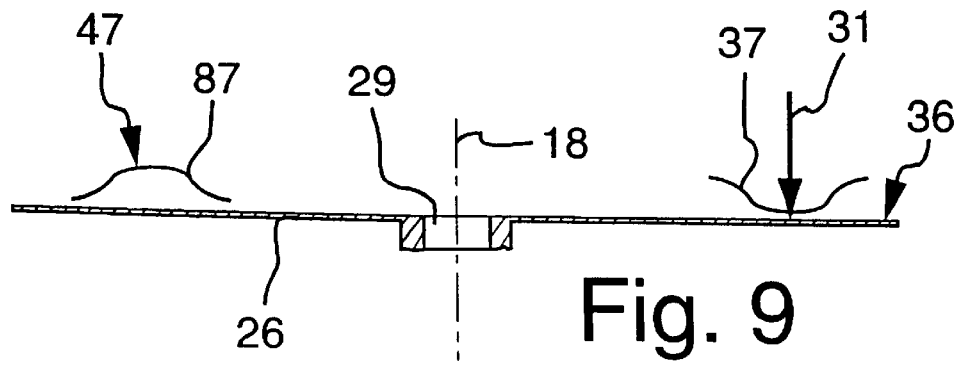

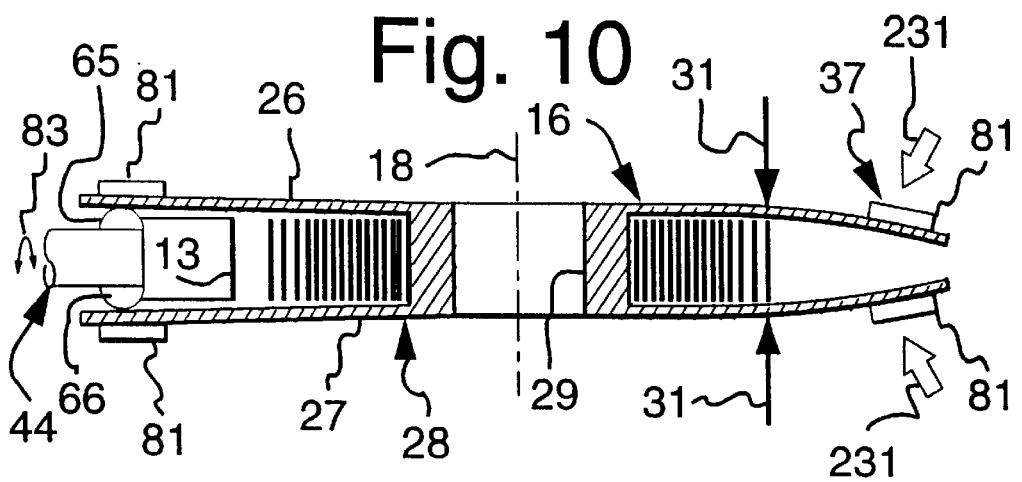
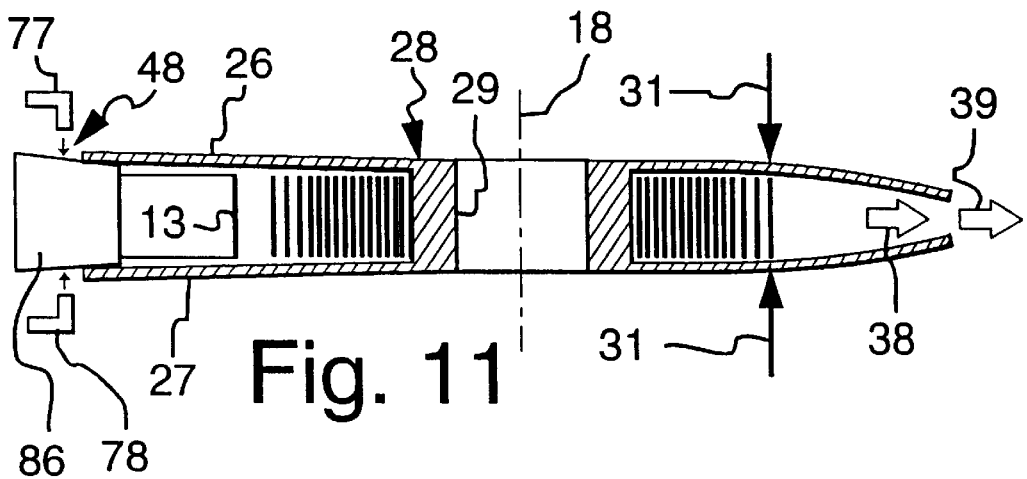
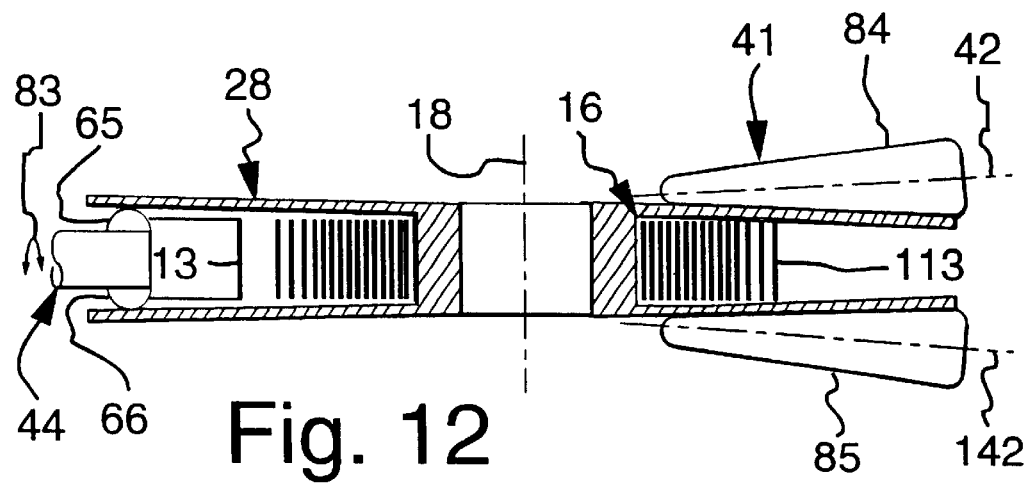

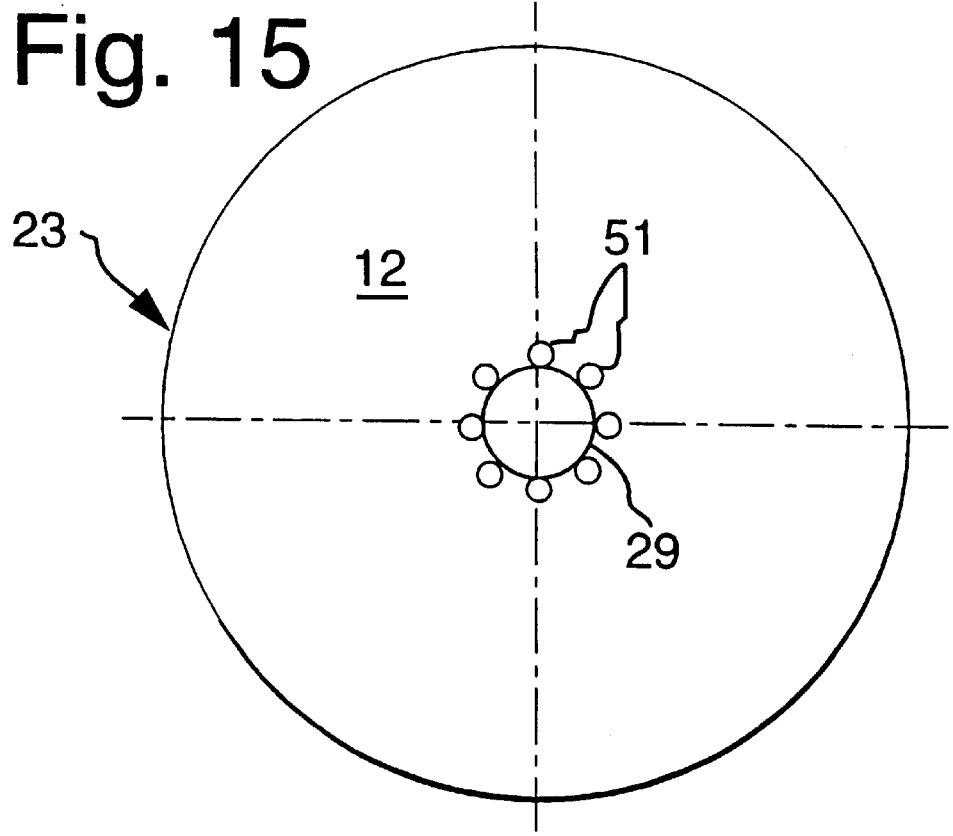
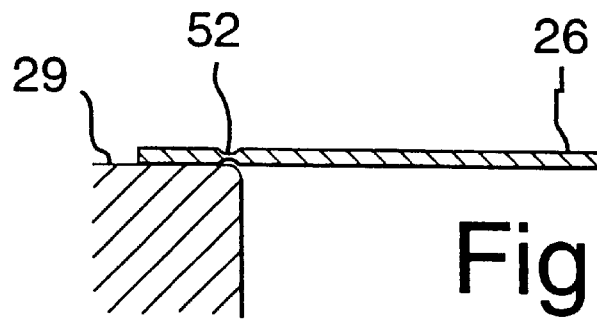
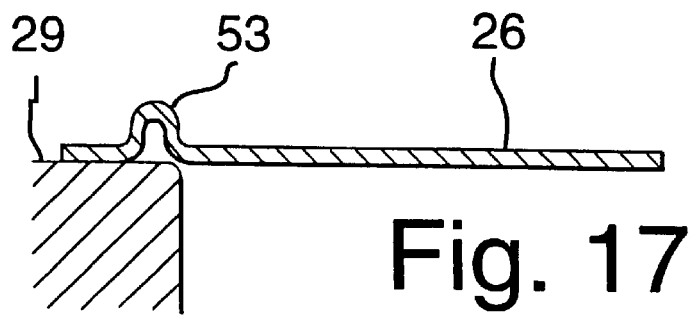

HIGH SPEED TAPE PACKING

The present patent application is a Continuation of prior application no. PCT/US98/26910, filed Dec. 17, 1998 entitled HIGH SPEED TAPE PACKING.

FIELD OF INVENTION

The subject invention relates to tape winding and packing at high speeds and includes packs of wound tapes having parallel co-planar tape edge sides.

BACKGROUND

In all tape drive systems both magnetic and optical, transverse or helical scan, and longitudinal, mono reel and dual reel, a limiting design factor is the ability to wind the tape media at high speed onto the reels in a smooth and consistent layer. A satisfactory tape pack is achieved only when the edges of successive tape wraps or windings onto a reel or otherwise into a pack are in the same plane. Misalignment of tape onto the reel, giving a scattered tape pack, typically leads to inadequate tape guiding on the next wind cycle through the tape transport and often results in problems due to media misalignment during read/write operations. An initially poor tape pack is inevitably followed by increasingly poor tape packing during successive tape winds until a severe pack scatter condition prevails. At low speed, adequate tape packing is generally not a serious problem and various techniques are traditionally implemented to provide the desired smooth tape pack. These techniques include tape edge guiding, reel flange packing, or active steering of the tape direction. In the former the tape media is guided by one of several means to force one tape edge against a stationary guiding block. These include edge top pressure via spring fingers, wedged guides, wedged air guides, or rollers rotating about axes radial to the axis of rotation of the tape pack and rotating on the tape pack at about the same speed as the tape pack itself.

Increasing tape speeds result in poor tape packing and require increasing forces to control the resultant larger amplitude tape displacements and tracking errors, leading to greater tape edge wear rates with correspondingly greater debris generation rates.

In flange packing, the system is constructed so that the medium is guided onto and constrained by a flange on the reel into which the tape is being fed. Active steering involves sensing of the tape path and inputting corrective signals to a tape support member driven by an actuator. This latter approach is complex and each of the first two approaches requires tape edge contact and inherently leads to tape edge damage after a number of winds/rewinds especially as the tape speed increased. Substantial reduction or elimination of edge damage due to many passes through a tape transport is particularly important where a large amount of data is contained on a single tape and is desired to be archived and then accessed many times. A high number of accesses can lead to rapid tape edge wear and damage, both of which eventually lead to the inability to successfully move tape and consequent tape transport malfunction. Many forms of tape edge guiding produce heat which leads to stretching of the tape beyond its elastic limit. This produces waviness at tape edges referred to as "marcelling." Such wavy part fails to contact the recording and playback heads properly for perfect recording and playback. Without proper guidance, tape tends to ride up on reel flanges during rapid winding, which also produces misalignment of tape relative to recording and playback heads.

In optical systems the tape wear situation is aggravated by the microscopic edge wear debris contaminating the tape data surfaces, leading to interference with data recording and recovery and increased bit error rates.

On the basis of conventional logic, the prior art identified air entrainment between the layers of tape on the take-up reel as the major destabilizing effect in high speed tape winding processes, and as primarily responsible for tape scattering in the resulting tape pack. In consequence, the prior art increased tape tension with increasing tape speeds in an effort to squeeze trapped air from in between all layers of tape forming in the tape winding process. As the industry moved in the direction of thinner tapes in the interest of greater volumetric efficiency, the increasing tape tensions of the prior art came to tax the physical strength of the tape, either stretching the tape beyond tolerable limits or restricting the maximum allowable tension and thereby increasing the amplitude of the pack scatter for a given tape speed.

In its search of a way out of this dilemma, the prior art resorted to packing devices for squeezing the air out of the pack. Both rotating and non-rotating devices have been used. These devices are often loaded against the outer diameter of the growing tape pack with a spring. The major drawback of this prior-art approach is that the incoming tape is locked by traction to the previous layer of tape in the lateral position of its approach, independent of whether that position is co-planer with the previously reeled layers of tape or not.

As the industry moves toward higher tape speeds in the interest of higher data transfer rates and faster data access times, the problem of pack scatter increases accordingly. Work along conventional methods of correcting pack scatter would require the application of greater and greater controlling forces to correct greater amplitude scatter at higher tape speeds. As controlling forces increase, damage to the tape resulting from these controlling forces increases. At high reeling speeds, pack scatter would overwhelm conventional methods of correction. Under some conditions, high tape tension and winding-to-winding misalignment can cause at least temporary and sometimes even a permanent distortion of the tape, thereby affecting if not destroying its information recording, storage and reproducing capability. Under extreme conditions, pack scatter will cause successive windings of tape to be hard packed against the upper reel flange and the lower reel flange. Unwinding tape from this extreme condition can cause further damage to the tape as the tape drags against the upper and lower reel flanges. Without tape flanges, and under certain conditions even with flanges, extreme pack scatter can cause tape to "jump" off a reel resulting in a jammed tape condition or a broken tape.

Scattered tape packs are particularly vulnerable to damage during handling and transport. Layers of tape which are unsupported by the edges of neighboring layers of tape are prone to be crushed, resulting in permanent tape damage.

SUMMARY OF THE INVENTION

It is a general object of the invention to overcome the above mentioned prior-art impasse with a break-through solution:

It is a germane object of the invention to provide superior tape winding techniques and systems.

It is a related object of the invention to produce and to enable production of superior tape packs whose radial opposite sides are perfectly co-planar and ideally are of mirror-like quality throughout thousands of reruns.

It is also an object of the invention to enhance information, storage and reproduction capability of tape media beyond prior state of the art feasibility.

Other objects of the invention will become apparent in the further course of this disclosure.

From one aspect thereof, the invention resides in a method of winding tape having opposite edges into an increasing tape pack about an axis of rotation, and more specifically resides in the improvement comprising, in combination, floating substantially each newly arriving winding of the tape on a fluid film on the increasing tape pack, establishing a substantially fluid-free tape pack wherein substantially all corresponding opposite edges of substantially all tape windings in the tape pack are co-planar along opposite radial planes of that tape pack, by continuously aligning opposite edges of substantially each new winding of the tape for a number of turns with corresponding edges of substantially all preceding windings of tape in the increasing tape pack with the aid of the fluid film, while gradually diminishing increments of that fluid film between the turns to zero until each leading turn of the number of turns has become locked to a remainder of the tape pack.

The invention resides also in packs of wound tape having perfectly co-planar tape edges at opposite radial sides of the packs, as produced by the method of the invention or by embodiments thereof at tape speeds in excess of three meters per second.

From a related aspect thereof, the invention resides in apparatus for winding tape having opposite edges into an increasing tape pack about an axis of rotation, and more specifically resides in the improvement comprising, in combination, an interwinding fluid film former coupled to the tape and through substantially each newly arriving winding of that tape for a number of turns at the tape pack, a tape edge aligner at substantially each of the newly arriving windings of the tape and fluid film formed at the increasing tape pack for the number of turns, and a tape winding locker coupled to each leading turn of the number of turns.

From a more specific aspect thereof, the invention resides in apparatus for winding tape having opposite edges into an increasing tape pack about a hub of a tape reel having an axis of rotation, comprising, in combination, the flexible reel flanges on opposite sides of the hub, an interwinding fluid film former coupled to the tape and through substantially each newly arriving winding of that tape for a number of turns at the tape pack, a tape edge aligner at substantially each of the newly arriving windings of the tape and fluid film formed at the increasing tape pack, and a tape winding locker coupled to each leading turn of the number of turns, with the tape edge aligner and tape winding locker including the flexible reel flanges and a continuous reel flange flexer coupled to these flexible reel flanges.

BRIEF DESCRIPTION OF THE DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which:

FIG. 7 is a side view of a tape pack with an improved tape edge aligning system according to a further embodiment of the invention;

FIG. 8 is a side view of a tape pack with an airfoil type of tape edge aligning system according to a further embodiment of the invention;

FIG. 9 is a developed view taken on the line 9—9 in FIG. 8 of the top reel flange with aerodynamic flange benders;

FIG. 10 is a side view of a tape pack with tape edge aligning system according to a further embodiment of the invention;

FIG. 11 is a side view of a tape pack with tape edge aligning system according to another embodiment of the invention;

FIG. 12 is a side view of a tape pack with tape edge aligning system according to yet another embodiment of the invention;

FIG. 15 is a top view of the reel shown in FIG. 13 with a modification pursuant to an embodiment of the invention;

FIG. 16 is a detail view of the tape reel shown in FIG. 13 with another modification pursuant to an embodiment of the invention;

FIG. 17 is a detail view of the tape reel shown in FIG. 13 with yet another modification pursuant to an embodiment of the invention;

For reasons of graphic feasibility and as more fully explained below, the drawings had to show all tape windings somewhat spaced from each other even where windings had become locked in a tight pack, since there otherwise would have been an impermissibly black block of tape after the lastly formed number of turns. In fact there actually is such a large supertight block of tape, as winding after winding becomes locked onto the tape pack in perfect co-planar relationship with all preceding windings on the pack. Similarly, the drawings for reasons of graphic feasibility have to show a spacing between each tape edge and adjacent reel flange, even where portions of such flanges contact tape windings for alignment purposes.

MODES OF CARRYING OUT THE INVENTION

The drawings illustrate various systems, apparatus and methods of winding tape at high speeds into packs of wound tape of superior quality having spaced parallel co-planar tape edge sides that are smoother and more scatter-free even after thousands of winding and rewinding operations, than in any prior-art tape pack produced at high speeds in excess of some three meters per second. The drawings also illustrate systems wherein tape unwound from and rewound into such packs passes through or past a recording, playback or other tape processing or interacting station at high speeds in excess of some three meters per second much more precisely than in any comparable prior-art system.

Figure 1:
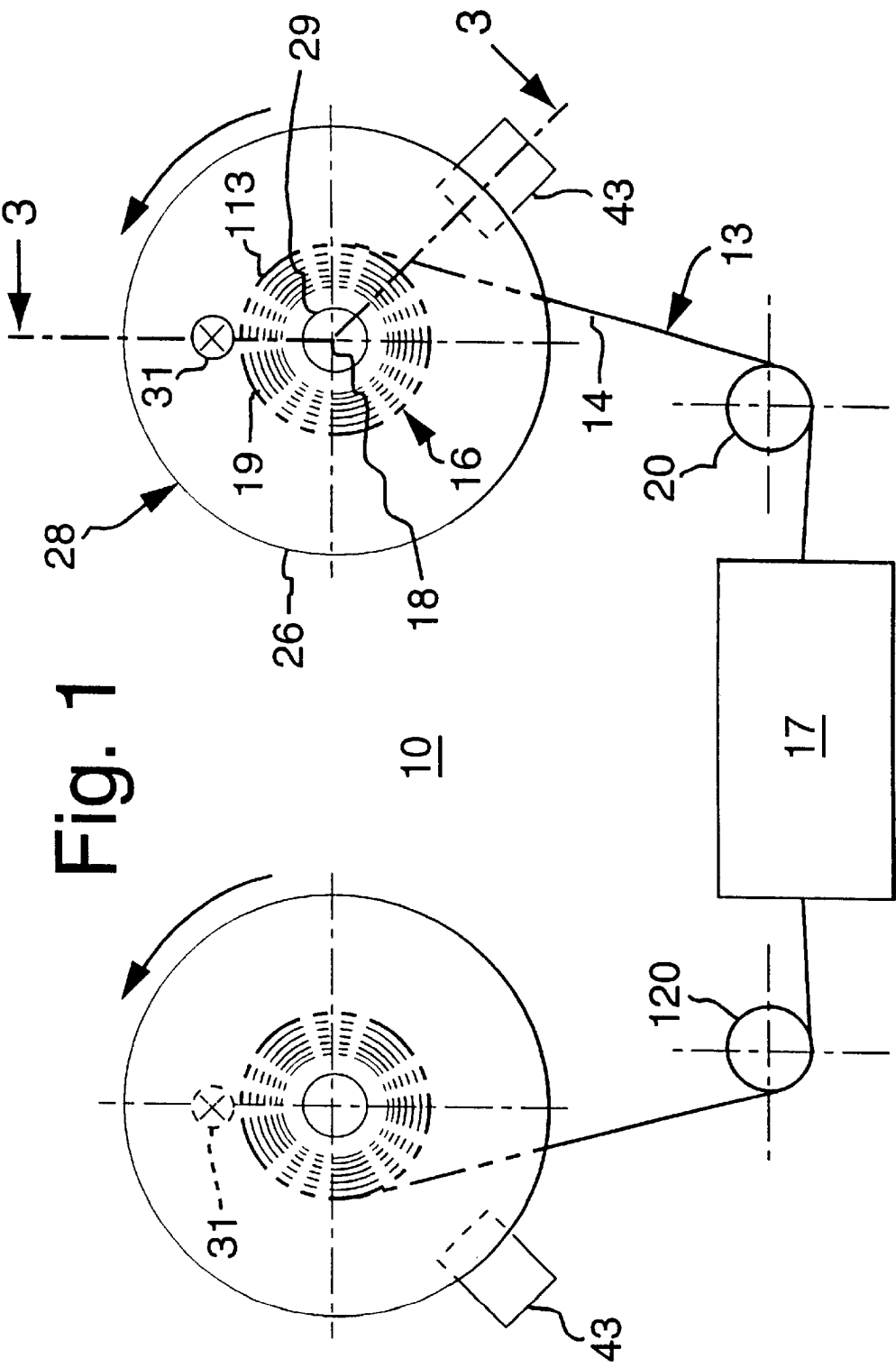
FIG. 1 is a top view of a tape deck and transport arrangement pursuant to an embodiment of the invention, with an angled section line 3—3 in that FIG. 1 indicating how tape reels may be sectioned for the showings of FIGS. 3, 5 et seq.
Figure 2:
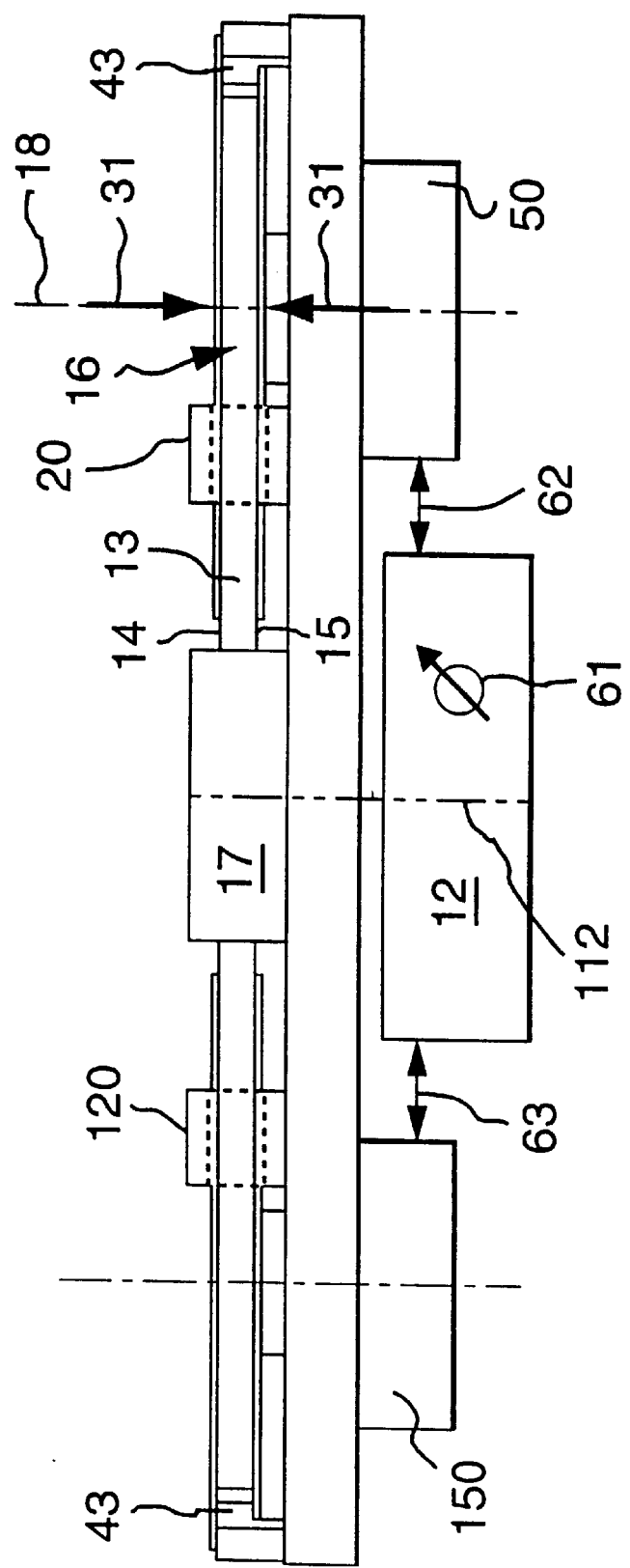
FIG. 2 is a side view of the transport of FIG. 1 with a block diagram of a tape tension control according to an embodiment of the invention.

For the sake of simplicity and ease of understanding, FIGS. 1 and 2 show a linear tape deck and transport arrangement 10, with a block diagram of a tape tension control 12 according to an embodiment of the invention. However, it should be understood that the subject invention and its embodiments are applicable to all kinds of tape drive systems, including tape recording, playback and/or dubbing systems, such as of a magnetic, optical or magneto-optical type, with longitudinal, transverse or helical scan technology, in mono reel, cartridge, dual reel or cassette systems. Moreover, the utility of the invention is not limited to tape recording and the like, but may extend to other applications where ultra precise tape or web guiding, winding and unwinding at high speeds is important or highly beneficial. Accordingly, the block 17 in FIGS. 1 and 2 symbolizes any tape recording, playback or processing station, as well as any tape drive. Tape guide rollers or posts 20 and 120 are also shown on the tape transport between station 17 and alternate tape supply and takeup reels.

The drawings including FIGS. 1 and 2 illustrate a method of winding tape 13 having opposite edges 14 and 15 into an increasing tape pack 16 about an axis of rotation 18. The invention floats substantially each newly arriving winding 113 of the tape 13 on a fluid film 19 on the increasing tape pack 16 and establishes a substantially fluid-free tape pack wherein substantially all corresponding opposite edges 14 and 15 of substantially all tape windings in the tape pack are co-planar along opposite radial planes 21 and 22 (see FIG. 3) of that tape pack 16. The invention does so by continuously aligning opposite edges 14 and 15 of substantially each new winding 113 of the tape for a number of turns 23 with corresponding edges of substantially all preceding windings of tape in the increasing tape pack with the aid of the fluid film 19, while gradually diminishing increments of that fluid film between the turns to zero until each leading turn of the number of turns has become locked to a remainder of the tape pack.

Figure 3:
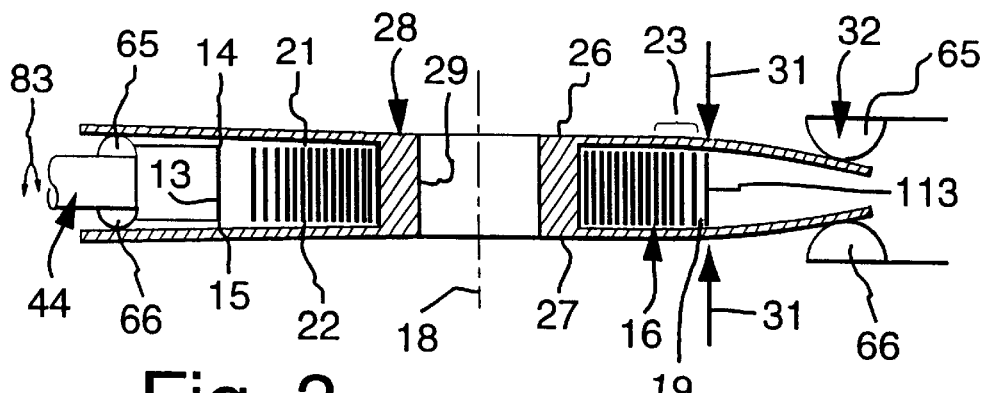
FIG. 3 is a section of a system similar to a section taken on the line 3—3 in FIG. 1 in order to show both a tape edge aligner and a reel flange spreader in relation to a tape pack according to an embodiment of the invention.
Figure 13:
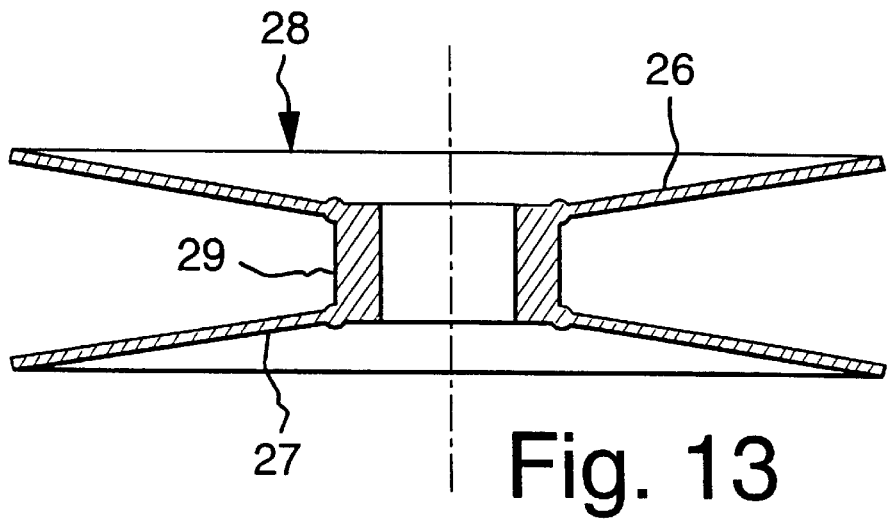
FIG. 13 is a side view of a tape reel according to a preferred embodiment of the invention.

Reference may in this respect be had to FIG. 3, since it shows the tape pack and its constituents on an enlarged scale. FIG. 3, as well as each of FIGS. 5 to 8, 10 to 12 and 14, may be viewed as a section taken on the angled line 3—3 in FIG. 1, except that alignment force imposers or tape edge aligners 32 to 41 and reel flange spreaders 43 to 48 have been added, as more fully described below. In these figures the left-hand side is the incoming side of the tape 13, and the right-hand side represents the tape packing side. FIG. 13 may also be viewed as a section taken on the angled line 3—3 in FIG. 1 or may be viewed simply as a diametral section on a reduced scale relative to the scale of its succeeding FIG. 14.

Reverting for the moment to basic principles, it may be noted that FIG. 3 shows the incoming tape 13, a newly arriving winding 113 of that incoming tape, and a remainder of the tape pack 16. FIG. 3 also shows the lastly formed fluid film 19 between that newly arriving winding and its preceding winding on the tape pack on which that newly arriving winding 113 floats. Increments of such fluid film extend from in between that newly arriving winding and in between the next preceding windings on the pack for a number of turns 23. As FIG. 3 and some of the other figures graphically illustrate, such fluid film increments diminish as they spiral inwardly into the winding tape pack.

For reasons of graphic feasibility, the drawings had to show all tape windings somewhat spaced from each other, since there otherwise would have been an impermissibly black block of tape after the lastly formed number of turns. However, according to the invention, there actually is such a large supertight block of tape, as winding after winding becomes locked onto the tape pack in perfect co-planar relationship with all preceding windings on the pack.

Similarly, the drawings for reasons of graphic feasibility have to show a spacing between each tape edge 14 and 15 and flange 26 and 27, respectively, of a tape reel 28. Such spacing in fact does exist and is necessary at and about the region where the tape 13 comes into the reel or goes out of that reel 28. However, at least in the illustrated embodiments of the invention there in fact is no lateral spacing between tape edge 14 and adjacent reel flange 26, nor is there a lateral spacing between the opposite tape edge 15 and reel flange 27, where alignment forces 31 are applied to the tape winding 113 and preceding windings for a number of turns 23 for alignment of tape windings 113 and 23 on the diminishing fluid film 19.

According to an embodiment of the invention, the above mentioned floating of substantially each newly arriving winding 113 of the tape and the continuous diminution of each fluid film increment is effected by tension control of the winding tape 13.

The above mentioned floating of substantially each newly arriving winding 113 of the tape 13 on a fluid film 19 on the increasing tape pack 16 may be effected by what we are calling an interwinding fluid film former, since each new fluid film 19 is formed between ("inter") each newly arriving winding 113 and the immediately preceding winding on the increasing tape pack 16, wherefore the expression "interwinding" (between windings) is appropriate. The tape tension control 12 is an example of such a fluid film former, as will become more readily apparent in the further course of this disclosure. Likewise, the tape tension control 12 may serve as a tape winding locker coupled to each leading turn of the number of turns of which the newly arriving winding 113 is the last turn. As its given name implies, such tape winding locker locks each newly arriving tape winding 113 after alignment for a number of turns to the then already tight windings on the tape pack 16. Such fluid film former and tape winding locker continuously operate sequentially on winding after winding as the tape pack grows during winding of the tape 13.

The invention also provides at substantially each of the new windings 113 of the tape 13 and fluid film 19 formed at the increasing tape pack 16 a tape edge aligner or alignment force 31 which with the aid of the fluid film 19 continuously aligns opposite edges 14 and 15 of substantially each new winding 113 of the tape with corresponding edges 14 and 15 of substantially all preceding windings of tape in that increasing tape pack. In FIGS. 2, 3 etc., such alignment force is symbolized by arrows at 31, whereas FIG. 1 shows an "arrow down symbol" in the form of a rear view of arrow 31 pointing toward the winding tape pack 16. FIG. 1 also shows a dotted arrow symbol for a tape alignment force 31 at the unwinding tape pack, so as to indicate that such an alignment force or tape edge aligner can be used at either tape pack, inasmuch as tape 13 may be wound on either side and alternatively be unwound from either side or reel.

By way of background, it will be recalled that the prior art came to identify air entrainment between the layers of the winding tape as the leading cause for a practically unavoidable destabilization of the winding tape at high tape speeds, leading to scattering of the windings in the tape pack, and all kinds of resulting problems. This in fact up to now was the limiting factor in the design of all high-speed tape drive systems and led to the desperate prior-art efforts that tended to distort the tape and thereby degrade the recording and playback processes and that at high tape speeds severely shortened tape life.

The subject invention goes just the opposite way by positively utilizing a boundary layer of air which 'attaches' to the tape surface during winding and travels with the tape to form the fluid film 19 on the increasing tape pack. Such utilization of the forming fluid film in a positive manner is in combination with the continuous alignment of opposite edges 14 and 15 of substantially each new winding 113 of the tape with corresponding edges 14 and 15 of substantially all preceding windings of tape in the increasing tape pack with the aid of such fluid film 19, and the gradual diminution to zero of substantially each fluid film increment that has served as an aid to alignment of corresponding opposite edges 14 and 15 of the tape until each leading turn of the above mentioned number of turns has become locked to a remainder of the tape pack 16, whereby substantially all corresponding opposite edges 14 and 15 of substantially all tape windings in the tape pack will be co-planar along opposite radial planes 21 and 22 of that tape pack, ideally with mirror-like quality.

Within the scope of the invention, various kinds of tape edge aligners and aligning methods are disclosed in the illustrated embodiments of the invention.

By way of example, FIGS. 1 to 12 and 14 show that an aligning of opposite edges 14 and 15 includes imposing on tape 13 a force 31 substantially parallel to fluid film 19 at substantially each of the new windings 113. These figures thus show tape edge aligners, such as at 32 to 41, as acting on substantially each of the new windings 113 in parallel to fluid film 19.

According to the embodiments shown in FIGS. 5 to 9 and 11, the force 31 is imposed with the aid of a pressure differential at tape 13. Such pressure differential may be generated with what we call a pressure differential generator, such as one of the overpressure generators 33 to 36, or an underpressure generator 39, as or in the tape edge aligner acting on substantially each of the new windings 113 in parallel to the fluid film 19 for a number of turns.

FIG. 11 symbolically shows the underpressure generator by an arrow 39. Depending on flexibility of tape flanges 26 and 27 and permissible rate of rotation of the tape reel 28, the underpressure generator 39 in fact may be a sufficiently fast rotation of the tape reel through a reel drive motor 50 with motor control 12 that air or fluid from the fluid film 19 is thrown off by centrifugal force, as indicated by the arrow 38 in FIG. 11, whereby the fluid film is diminished until each newly arriving winding has become locked to the remainder of the tape pack after a number of turns of tape alignment. Where that is inadequate in certain applications, a vacuum pump device or other fluid removal apparatus may be used as the symbolically indicated underpressure generator 39. In either case, the reel flanges are pulled together or contracted into edge alignment contact with each newly arriving tape winding 113 for a number of turns.

The aligning of the opposite edges 14 and 15 includes tape edge guiding of tape 13 at substantially zero relative motion between tape edge guide and tape at substantially each of the new windings 113 in the illustrated embodiments of the invention. In this respect, the tape edge aligner may include a tape edge guide of substantially zero motion relative to and at substantially each of the new tape windings 113. Such zero relative motion may be realized or effected with the aid of reel flanges 26 and 27 with or without further alignment force imposers, such as more fully disclosed below.

In some embodiments of the invention, the tape edge guide preferably is rotated with rotation of tape 13 during tape winding. The tape edge aligner thus may include a rotary tape edge guide of substantially zero motion relative to and at substantially each of the new windings 113. Such rotary tape edge guide, except for the embodiment described below in conjunction with FIG. 12, may have an axis of rotation 18 substantially parallel to the fluid film 19 formed at the increasing tape pack 16, such as in the case of reel flanges 26 and 27 which rotate about the axis of rotation 18 of the tape reel 28. Of course, this is only an embodiment of a broader concept pursuant to which the tape edge guide can rotate about any other axis, as long as that produces the substantially zero motion relative to and at substantially each of the new windings 113 of this embodiment of the invention.

For instance, the tape edge guide 41 according to the embodiment shown in FIG. 12 is rotated toward and away from tape 13. By way of example, that rotary tape edge guide 41 has an axis of rotation 42 substantially transverse to the fluid film 19 formed at the increasing tape pack 16, or radial to the axis of rotation 18.

According to the illustrated embodiments of the invention, tape 13 is wound on a hub 29 of a tape reel 28 having flanges 26 and 27 at opposite sides of that hub, and the opposite edges 14 and 15 of substantially each new winding 113 are continuously aligned with such flanges, while the tape reel is in rotation about an axis 18, such as shown in FIGS. 1 to 12 and 14. The tape edge aligner in apparatus according to this aspect of the invention may include a continuous reel flange flexer coupled to reel flanges 26 and 27. As its given name implies, such reel flange flexer continuously flexes the reel flanges.

Examples of reel flange flexers are shown in FIGS. 3 to 12 and 14 at 32 to 41. Preferably, flanges 26 and 27 are continuously flexed onto opposite tape edges 14 and 15 of substantially each new winding 113 such as with the aid or by action of alignment forces 31 or aligners 32 to 41, such as shown in FIGS. 1 to 12 and 14.

Conversely, flanges 26 and 27 may continuously be flexed apart where tape 13 enters reel 28 during tape winding, such as seen in FIGS. 1 to 12 and 14; that is, where tape moves relatively to the reel flanges, or, in other words, where relative motion between tape and reel flange is not substantially zero. In this respect, reel flange spreaders 43 to 48 are respectively shown in FIGS. 1 to 12 where the tape 13 enters the reel 28 during tape winding or, for that matter, where the tape exits the reel during unwinding.

Figure 14:
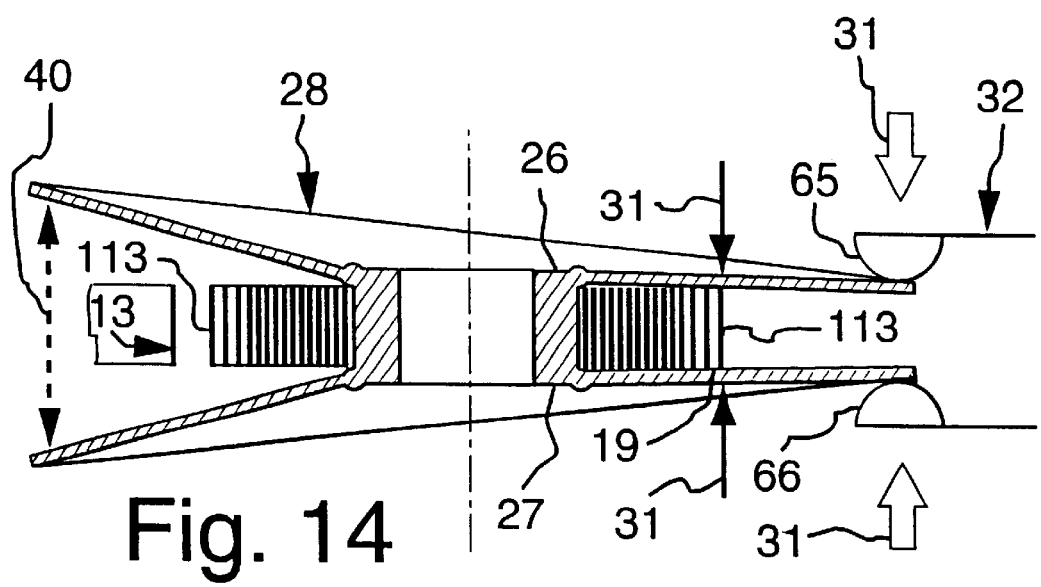
FIG. 14 is a view similar to FIG. 13 showing flanges of the tape reel flexed for tape entry reception and for tape alignment pursuant to a preferred embodiment of the invention.

In this respect, the tape edge aligner in effect may include a reel flange spreader as well, as it does for instance in the embodiment of FIG. 14 where tape edge aligner and reel flange spreader are incorporated in the same structure 32. In this respect, as seen with the aid of FIG. 14, flanges 26 and 27 are continuously flexed onto opposite tape edges 14 and 15 of substantially each new winding 113 while continuously flexing apart where the tape 13 enters the reel during tape winding, as symbolically shown by the double-headed arrow 40 in FIG. 14.

In particular, the flexible reel flanges 26 and 27 according to the embodiment of the invention shown in FIGS. 13 and 14 have different spacings at their circumferences or peripheries than at the reel hub 43. As specifically illustrated in FIGS. 13 and 14, the flexible reel flanges 26 and 27 may be further apart at their circumferences or peripheries than at the reel hub. Such flexible reel flanges may be or may be preformed to be conical. In this respect, such conical flanges may be concavely conical or otherwise spread outwardly, such as particularly seen in FIG. 13, or may be convexly conical or spread inwardly to be closer to each other at their peripheries than at hub 29, such as discussed below in conjunction with FIG. 14. Either case invokes the principle set forth in the next paragraph hereof:

Structures of conical shape, including the frustoconical or flattened cone shape of the tape reel flanges 26 and 27, have the characteristic of maintaining a constant circumference at their periphery. In other words, the perimeter of the conical shape stays constant even if the cone is flexed. If the edge of the cone is moved at the periphery to increase or decrease the angle of inclination of the cone relative to the hub 29, such as by rotating the conical flanges 26 and 27 in between the tape aligner pads 65 and 66 for instance or in between other tape edge aligners such as shown in FIGS. 5 to 9 and 12, then the shape of such cone must deviate from its original conical shape, such as from its original shape shown in FIG. 13, in order to maintain the constant peripheral length or circumference. If at pads 65 and 66 the angle of inclination of the cone surface is varied so as to bring the reel flanges 26 and 27 into aligning contact with newly arriving tape windings 113 et seq., then the angle of inclination must conversely vary itself somewhere else in order to maintain the constant perimeter length. Accordingly, a tight spacing of flanges 26 and 27 for aligning contact with newly arriving tape windings 113 et seq. spreads the flanges in the region where tape 13 enters the reel 28, such as indicated by double headed arrow 40 in FIG. 14. This also applies conversely if the flexible reel flanges 26 and 27, as mentioned above are convexly conical or are closer to each other at their periphery than at hub 29. In such case, the double-headed arrow 40 symbolizes a reel flange spreader, which could be similar to any of the spreaders 43 to 48 shown in FIGS. 1 to 12. By thus spreading the flanges apart when and where the tape 13 enters or exits the tape reel, such reel flanges flex in contact with incoming tape windings 113 at an angular displacement from the arrow 40, thereby acting as tape winding aligners instead of specific aligners 32, which could then be omitted.

In that sense, FIG. 14 in effect is an illustration of both (a) working with reel flange that so to speak is concavely conical, as shown in FIG. 13, or (b) working with the above mentioned alternative convexly conical reel flange structure.

Accordingly, FIG. 14 illustrates two examples wherein tape edge aligner and reel flange spreader are unified in one structure, such as at 32 or at 40, as discussed above.

Moreover, in the case of the alternative convexly conical flexible reel flange structure, where flanges 26 and 27 converge inwardly toward their peripheries or are otherwise closer to each other at their circumferences or peripheries than at hub 29, such inwardly converging or biased reel flanges would be tight against at least the outer edge of the tape pack 16 during storage, shipping, and the like, and would be spread apart, such as illustrated by the arrow 40, when access to the tape 13 or winding or unwinding is desired.

The reel flanges may be biased and inherently flexible or may be aided by various flexibility-imposing measures or structures. For instance, the reel flanges 26 and 27 may be cantilevered or hinged relative to hub 29. As shown in FIG. 15 for one of the reel flanges, the flexible reel flanges 26 and 27 may have a series of apertures 51 at the reel hub 29. Such apertures may be in a pattern encircling the hub to increase the flexibility of the flanges relative to that reel hub.

According to the embodiment shown in FIG. 16, the flexible reel flanges 26 and 27 have a hinge 52 at the reel hub 29. Such hinge may be in the form of a ring of reduced or thin cross-section around the juncture of flange and hub, such as in the form of a so-called 'living hinge' often found in polypropylene parts and other plastics structures.

As seen in FIG. 17, the flexible reel flanges 26 and 27 have a concentric convolution 53 at the reel hub 29. Such concentric convolution may be of the type used in metal and other diaphragms, such as in aneroid or other bellows, except that preferably only one convolution is used in each reel flange and is situated closely at the reel hub, so as not to interfere with the tape winding and aligning process. This preferably applies to all embodiments shown in FIGS. 16 to 20 where, as in FIGS. 17 and 19, the hinge 52 or convolution 53 is located substantially outside of the hollow-cylindrical inside surface of the reel hub 29.

Figure 18:
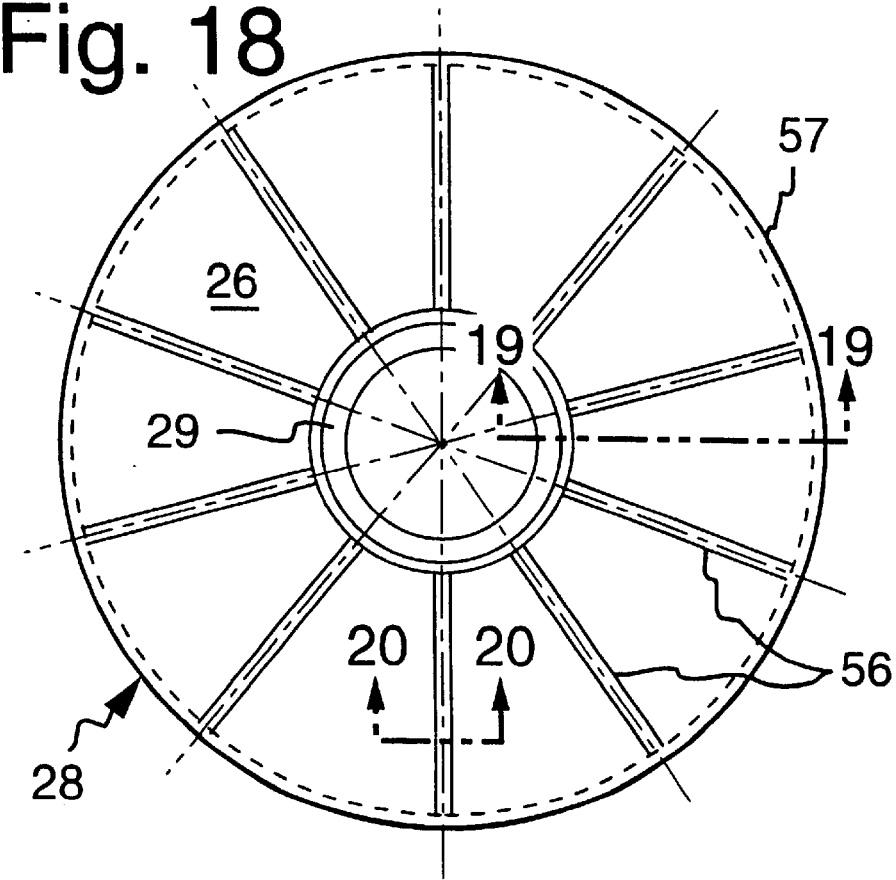
FIG. 18 is a top view of a tape reel pursuant to a further embodiment of the invention.
Figure 19:
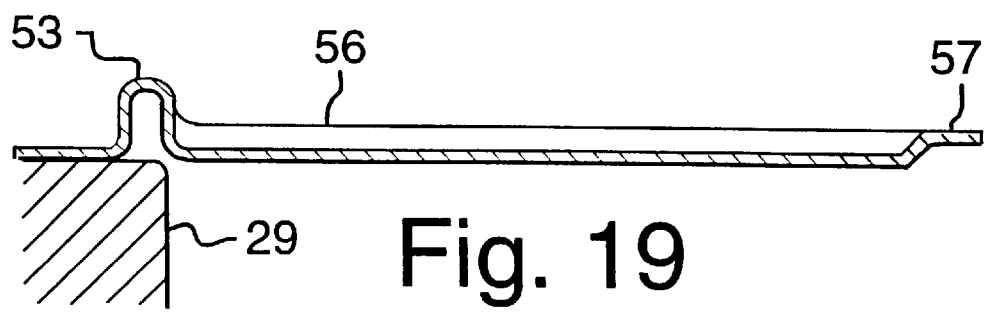
FIG. 19 is a section taken on the line 19—19 in FIG. 18.
Figure 20:
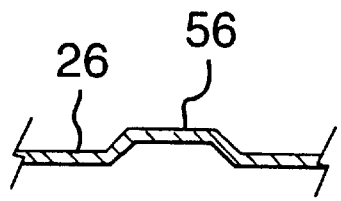
FIG. 20 is a section taken on the line 20—20 in FIG. 18.

According to the embodiment of the invention illustrated in FIGS. 18 to 20 for both of the flanges 26 and 27 with the aid of a showing of one of these flanges, the flexible reel flanges 26 and 27 have radial ridges or other stiffeners 56 at their outsides. Such stiffeners may extend from reel hub 29 or from a concentric convolution 53 or other hinge or cantilever structure at the reel hub 29 to an angular margin 57 at the flange periphery where tape alignment force imposers, such as shown in FIGS. 3, 8, 9 and 14 at 32 or 36, may be active. Such as stiffeners, the flexibility of the flanges, and other parameters are mutually balanced in effect for best performance in any such situation.

Figure 4:
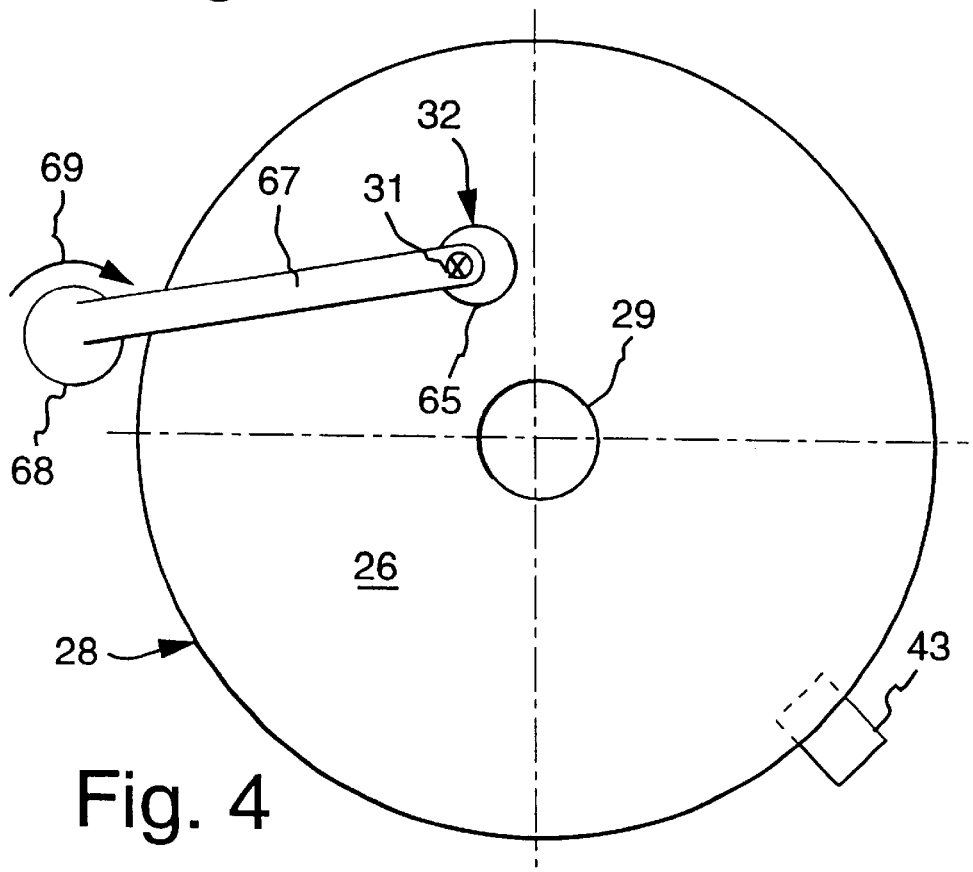
FIG. 4 is a top view of a tape pack with an improved tape edge aligning system according to a further embodiment of the invention.

The alignment force imposers or tape edge aligners 32 in FIGS. 3, 4 and 14 may have a pair of pressure pads 65 and 66 between which the reel flanges 26 and 27 are situated. Such pads will be contoured to slope with the flange form where they are in contact with the tape flange 26 or 27 and preferably have a hard smooth finish in contact with the flange, so as to make them long lasting and gentle, and harmless to the flange. By way of example, such a finish is available as flame polished sapphire or ceramic or as a hard polished chrome plate. The same applies to the flange spreaders 43 and 44 which contact inward surfaces of the reel flanges, such as shown in FIGS. 1 to 4, 10 and 12.

Alignment force imposers or tape edge aligners may bear against or act on a peripheral region of tape flanges 26 and 27, such as shown for aligner 32 or 36 in the embodiments of FIGS. 3, 8 and 14.

Figure 5:
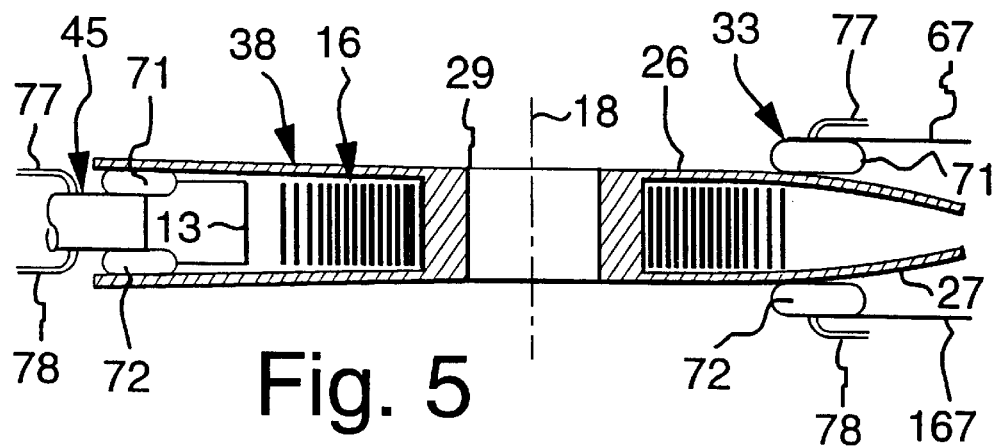
FIG. 5 is a side view of a system similar to that of FIG. 4, but with an air bearing-type of follower according to an embodiment of the invention.

Pursuant to a further embodiment of the invention, such or other alignment force imposers or tape edge aligners 32 or 33 may in effect follow the periphery of the tape pack 16 as it grows on hub 29 in reel 28, such as shown in FIGS. 4 and 5. As shown by way of example in FIG. 4 for the aligner 32 and, for that matter also for the aligner 33 shown in FIG. 5, either of such aligners may be mounted on arms 67 or 167 pivoted at 68, such as shown in FIG. 4 which also includes a curved arrow 69 symbolizing a spring bias or driving force for arms 67 and 167. Preferably, such mounting arms of aligners 32 or 33 will be light and spring loaded, and balanced to avoid displacement by small shock or acceleration loads at the tape transport.

In many cases where the chosen reel flanges 26 and 27 are very thin, bias 69 will adequately cause aligners 32 to follow the forming tape pack 16 as it grows from near the reel hub 29 to close to the reel periphery. However, where the aligner 33 does not touch the flanges, or where circumstances require more precise guidance for the aligner 32, a servo control may be used at 69. Such controls are known per se and typically use a tape sensor, such as a feeler or a light source-photocell combination that senses the location of each newly forming outer tape winding 113 and that moves the aligners 32 and 33 accordingly, such as with a small motor at 68 or 69 that receives its drive signal in accordance with an output signal of the above mentioned tape sensor. Flanges 26 and 27 may be transparent for that purpose and for any other reason as well.

The tape aligner may be flange-touching, such as the aligner 65, 66 in FIGS. 3, 4 and 14, or may be non-touching, such as, for instance, the aligners 33 to 34 shown in FIGS. 5 to 9. Non-touching tape aligners that provide the necessary push or alignment force 31 include air bearings at each flange 26 and 27. Such air bearings may for instance comprise pads 71 and 72 or bars 73 or 74 with perforations 75 shown for air bearing 35 in FIG. 7, but also implied for the air bearing 33 in FIG. 5 and for other air bearings at 45 shown in FIGS. 5 and 7.

Such air bearings are supplied with air or another desired fluid from a source of compressed air or fluid. In order to avoid crowding of the drawings with components that are conventional per se, such compressed air or fluid sources are symbolized in FIGS. 5, 7 and 11 by fluid supply lines 77 and 78, rather than by boxes symbolizing the fluid supplies themselves.

As indicated by way of example in FIG. 7 and typically for all the air bearings herein disclosed, air bearing perforations 75 are located on the side of the air bearing or air bearing part facing the flange. Air or other fluid flows from such air bearing at a pressure of a few pounds per square inch (psi) or a pressure on the order of ten kilo pascal. The number, size, shape and location of perforations 75 is a design variable. The air bars or active air bearing surfaces are located less than a millimeter from each flange surface.

Figure 6:
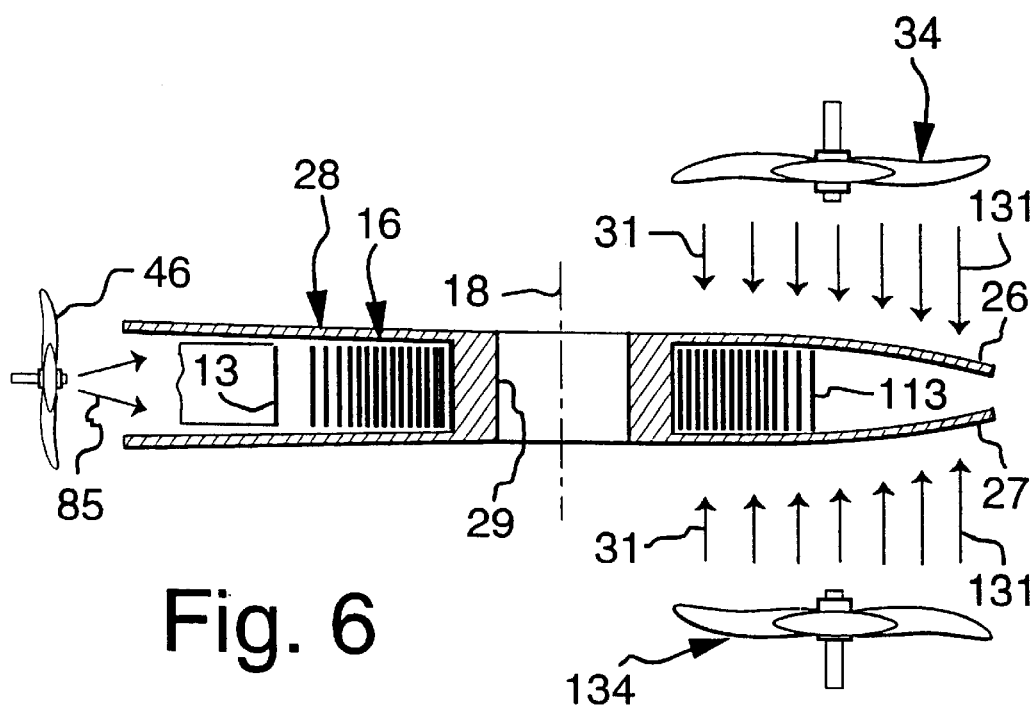
FIG. 6 is a side view of a tape pack with tape edge aligning system according to a further embodiment of the invention.

Air bearings are not the only way of using air to move reel flanges. By way of further example, FIG. 6 shows blowers, fans or other air movers 34 and 134 for continually pressing reel flanges 26 and 27 into contact with newly arriving tape windings 113 with the aid of air streams 131 creating alignment forces 31.

Pursuant to the embodiment shown in FIGS. 8 and 9, a tape edge aligner 36 includes airfoils 37 and 38 for pushing the reel flanges 26 and 27 continuously toward each other, such as with the kind of airfoil shape shown at 37 in the developed view of FIG. 9, which wedges air moving along with the reel flanges between such foil and adjacent reel flange, thereby generating the requisite tape alignment force 31.

FIG. 10 shows what we call a centrifugal tape edge aligner 37, since it creates a centrifugal force above the reel flange 26 or below the reel flange 27 which has the effect of pushing such reel flanges toward each other, as indicated by arrows 231. By way of example, such illustrated embodiment of the invention uses weights 81 distributed about the peripheries of the reel flanges 26 and 27 and which have centers of gravity spaced outwardly from outside of such flanges so that inwardly acting flange-bending forces 231 with consequent tape edge alignment forces 31 develop by centrifugal action during rotation of the flanges 26 and 27 or tape reel 28.

Accordingly, FIG. 10 and the first described version of FIG. 11 are illustrative of an embodiment of the invention wherein tape edge alignment forces 31 are imposed by centrifugal action or, as its given name implies, by centrifugal action alignment force imposers such as shown at 81 in FIG. 10 or at 12–50, in FIG. 2 and relevant to the first described version of FIG. 11 generating centrifugal forces at 38, 39 through rapid rotation of the tape reel 28.

The tape edge aligner 41 shown in FIG. 12 uses or comprises rollers 84 and 85 rotating respectively about axes 42 and 142 that extend radially of or substantially transversely to the axis of rotation 18 or the tape reel 28. Rollers 84 and 85 may contact the reel flanges 26 and 27 so as to be rotatably driven thereby.

Soft brushes, which preferably are conical and rotatably mounted, may be used as rollers 84 and 85. The apex of such brush cone points towards the axis 18 of the reel 28 so that if the brush rotates with the flange motion, the surface brush speeds and reel flange speeds will substantially match at all points along the brush. Likewise, if there is slippage it will be uniform along the length of the brush. The brush may be soft fibers or elastomeric foam. A bristle brush may be positioned so that there is some bending of the soft bristles to give the desired pressure in a less dimensionally crucial way with an allowable small speed difference.

Closer attention may now be directed to the above mentioned reel flange spreaders 43 to 48 that continuously spread successive portions of the reel flanges 26 and 27 apart to make room for the incoming tape 13 during winding and for the outgoing tape 13 during unwinding of the tape pack 16. This in contrast to the tape edge aligners 32 to 36 which continuously push successive portions of the reel flanges together at a location angularly spaced from the reel flange spreaders or tape entry and exit position, such as by an angle on the order of one-half to one π rad.

However, much of what has been disclosed herein with respect to the type, structure, configuration, mounting, quality, surface hardness, and air or fluid supply, where applicable, of tape edge aligners 32 to 36 may also be applied to tape spreaders 43 to 48. Accordingly, like reference numerals are employed at components 32 and 44 and 33 and 45 where like or functionally equivalent components may be employed, including pressure pads 65 and 66, or air bearings 71 and 70 and pressurized air or fluid supplies 77 and 78.

In this respect, pressure pads 65 and 66 of spreaders 44 contact inside surfaces of reel flanges 26 and 27 to push such flanges outwardly where the tape 13 enters or exits the reel. As indicated by a rotary arrow 83 in FIGS. 3, 10 and 12, the flange spreader 44 may be angularly displaceable, such as about a central axis of symmetry transversed to the axis of rotation of the tape reel. The peripheral shape of such spreader 44 or the peripheral configuration of its pressure pads 65 and 66 may be elliptical or otherwise non-circular, so as to vary and control the degree of spreading of the reel flanges by angular displacement of such spreader.

Similarly, air or fluid supplies 77, 78 to air bearings 71 and 72 may be varied so as to vary or control the degree by which the reel flanges are either contracted or distended.

Spreader 46 in FIG. 6 is similar to tape edge aligner 34, except that it blows air 85 that spreads the reel flanges 26 and 27 apart at the tape entry and exit location. Sometimes a refinement is required in this respect, such as the provision of an angled deflector 86 that guides streams of air or fluid from the supply 77, 78 to in between flanges 26 and 27, in similarity to air bearings 71 and 72.

The airfoil type of tape aligner 36 also has a counterpart at the flange spreader, such as shown in FIGS. 8 and 9. In particular, spreader 47 may include airfoils 87 and 88 for lifting the reel flanges 26 and 27 continuously away from each other, such as with the kind of airfoil shape shown at 87 in the developed view of FIG. 9, which lifts air moving along with the reel flanges between such foil and adjacent reel flange, thereby generating the requisite reel flange lifting or spreading force.

According to a preferred embodiment of the invention, the above mentioned floating of substantially each newly arriving winding 113 of tape 13 and the continuous disposal of substantially each fluid film increment that has served as an aid to alignment, is effected by a tension control of the winding tape.

This is different from the above mentioned prior-art effort to inhibit as much as possible the formation of any tape-scattering fluid film. That prior-art effort became more and more frantic as tape speeds increased, since the formation of any fluid film at the incoming and subsequent tape winding was seen as the primary cause for the scattering of the tape during its winding and for the resulting poor tape packs and all the ensuing prior-art ills, including irregular course of the tape at the tape recording and playback station, and damage of the tape through intrusive tape guiding procedures and through exorbitant tape tension. Tape tension became excessive when the prior art saw no way out of the impasse than to more and more increase tape tension for increasing tape speeds, until the fast running tapes were temporarily, if not permanently, deformed in the process, with consequential degradation of the recording, playback, dubbing or other process interacting with the winding or unwinding-rewinding of the tape.

The subject invention prevents such excesses by using tape tensioning to dispose of fluid film increments only in combination with one of the above mentioned alignment techniques which employ the previously disdained fluid film as an aid to tape edge alignment for the achievement of high-quality tape packs according to the invention and its embodiments.

Accordingly, the tape tension control, such as shown at 12 in FIG. 2, preferably imposes a tension on the traveling tape 13 on the order of a thousand pounds per square inch or seven hundred grams per square millimeter during tape winding on either reel. By way of example, prototypes according to the invention have used four ounce tension on half inch wide tape of half mil thickness or hundred fifteen grams on tape of 12.7 millimeter width and thirteen microns (13 $\mu$m) thickness. This is much less than what the prior art imposed on tapes for very high tape speeds.

The tape tension control system includes reel drive motors 50 and 150 shown in FIG. 2 in conjunction with the tape tension control 12. Such control may be in the form of a variable motor control 61 driving tape drive motors 50 and 51. Double headed arrows 62 and 63 indicate that tape drive motors 50 and 150 are servo controlled by the variable motor control 61 in the tension control system.

In this manner, the desired tape tension for perfect tape alignment and locking in the pack 16 may be realized by restraining unwinding of the tape at the left-hand side of FIGS. 1 and 2 while driving the tape for its winding at the right-hand side into the desired tape pack 16. Motor control 61 may be varied, until the proper balancing between that tape driving force and that tape unwinding restraint has been realized for the desired tape tension. The resulting lower tension on the tape compared to certain high speed prior-art tape winding efforts, in combination with a relatively low aligning force at the tape edges and substantially no relative motion between tape edge aligners and tape edge according to preferred embodiments of the invention render tape edge wear and any other tape damage negligible if not practically undetectable.

As the tape winds, successive layers of tape under tension add compressive forces to previously wound layers for a tighter tape pack. Such tension eventually may decline to zero at or toward the center of the tape pack or go into compression in larger tape reels. The result is a tighter tape pack.

As customary in the art of tape recording and playback, and elsewhere, the control 12 may also include a tape drive, such as a conventional drive of the type that rotates a capstan in engagement with the tape 13 for propulsion thereof, as symbolized by the phantom line 112 in FIG. 2.

Tape thicknesses on the order of ten microns ($\mu$m) and tape speeds on the order of dekameters per second may successfully be handled by embodiments of the subject invention. Reel flanges 26 and 27 may have a thickness on the order of fifty to five hundred microns ($\mu$m) depending on application. By way of example, steel or plastics may be used as reel flange material. For optical or other non-magnetic recording, magnetic fields may be used with reel flanges that are of or include ferromagnetic or at least electrically conductive material that permit generation of counter magnetic fields through eddy currents and the like, for tape edge alignment by flange contraction and/or for flange distention at the tape entry and exit region. Electrostatic or piezoelectric phenomena may also be employed where they do not interfere with any tape recording, playback or processing feature in particular cases.

The invention resides also in packs 16 of wound tape 13 having perfectly co-planar tape edges 14 and 15 at opposite radial sides 21 and 22 of the packs, as produced by the method of the invention or by embodiments thereof, such as herein disclosed and such as illustrated in the accompanying drawings by way of example.

Recording track densities on the order of a hundred to several thousand tracks per millimeter may be realized with the techniques of the subject invention.

The flanges used and/or the packs produced by the subject invention and embodiments thereof may be implemented in tape packs, reels, cartridges and cassettes and in other combinations.

The subject disclosure provides specific examples of various embodiments, and also puts forth novel teachings that suggest various parameters those skilled in the art should look for. Once one has been taught what to look for, one can find various solutions within the scope of the teaching and beyond such teaching within the scope of the broader invention. This manifestly is the case with the subject extensive disclosure which accordingly will render apparent or suggest to those skilled in the art various modifications and variations within the spirit and scope of the invention.

We claim:

1. In a method of winding tape having opposite edges into an increasing tape pack about an axis of rotation, the improvement comprising in combination:

floating substantially each newly arriving winding of said tape on a fluid film on said increasing tape pack, wherein the tape enters a reel flange spreader; and establishing a substantially fluid-free tape pack wherein substantially all corresponding opposite edges of substantially all tape windings in said tape pack are co-planar along opposite radial planes of said tape pack, by continuously aligning opposite edges of substantially each new winding of said tape for a number of turns with corresponding edges of substantially all preceding windings of tape in said increasing tape pack with the aid of said fluid film, while gradually diminishing increments of said fluid film between said turns to zero until each leading turn of said number of turns has become locked to a remainder of the tape pack.

2. A method as in claim 1, wherein:

said aligning of said opposite edges includes imposing on said tape a force substantially parallel to said fluid film at substantially each newly arriving winding for said number of turns.

3. A method as in claim 2, wherein:

said force is imposed with the aid of a pressure differential at said tape.

4. A method as in claim 2, wherein:

said force is imposed with the aid of an overpressure at said tape.

5. A method as in claim 1, wherein:

said aligning of said opposite edges includes tape edge guiding said tape at substantially zero relative motion between tape edge guide and tape at substantially each of said newly arriving winding for said number of turns.

6. A method as in claim 5, wherein:

said tape edge guide is rotated with rotation of said tape during said winding.

7. A method as in claim 5, wherein:

said tape edge guide is rotated toward and away from said tape.

8. A method as in claim 1, wherein:

said tape is wound on a hub of a tape reel having flanges at opposite sides of said hub; and said opposite edges are continuously aligned with the aid of said flanges.

9. A method as in claim 8, wherein:

said flanges are continuously flexed onto said opposite edges beginning with substantially each newly arriving winding.

10. A method as in claim 8, wherein:

said flanges contact said tape only where there is substantially no relative motion between said flanges and said tape.

11. A method as in claim 1, wherein:

said flanges are continuously flexed apart where said tape enters said reel during said winding.

12. A method as in claim 1, wherein:

said floating of substantially each newly arriving winding of said tape and the continuous diminution of each fluid film increment is effected by tension control of the winding tape.

13. A method as in claim 1, wherein:

said tape is wound at a tension on the order of a thousand pounds per square inch.

14. In an apparatus for winding tape having opposite edges into an increasing tape pack about an axis of rotation, the improvement comprising in combination:

an interwinding fluid film former coupled to said tape and through substantially each newly arriving winding of said tape for a number of turns at said tape pack;

a reel flange spreader where said tape enters each newly arriving winding;

a tape edge aligner at substantially each of said newly arriving windings of said tape and fluid film formed at said increasing tape pack for said number of turns; and a tape winding locker coupled to each leading turn of said number of turns.

15. Apparatus as in claim 14, wherein:

said tape winding locker includes an interwinding fluid expeller coupled through said number of turns in parallel to said fluid film.

16. Apparatus as in claim 14, wherein:

said aligner includes an alignment force imposer acting on substantially each of said newly arriving windings for said number of turns in parallel to said fluid film.

17. Apparatus as in claim 14, wherein;

said aligner includes a pressure differential generator acting on substantially each of said newly arriving windings for said number of turns in parallel to said fluid film.

18. Apparatus as in claim 14, wherein:

said aligner includes an overpressure generator acting on substantially each of said newly arriving windings for said number of turns in parallel to said fluid film.

19. Apparatus as in claim 14, wherein:

said aligner includes a tape edge guide of substantially zero motion relative to and at substantially each of said newly arriving windings for said number of turns.

20. Apparatus as in claim 14, wherein:

said aligner includes a rotary tape edge guide of substantially zero motion relative to and at substantially each of said newly arriving windings for said number of turns.

21. Apparatus as in claim 20, wherein:

said rotary tape edge guide has an axis of rotation substantially parallel to said fluid film formed at said increasing tape pack.

22. Apparatus as in claim 20, wherein:

said rotary tape edge guide has an axis of rotation substantially transverse to said fluid film formed at said increasing tape pack.

23. Apparatus as in claim 14, wherein:

said sequential fluid film former and said tape winding locker include a tape tension controller.

24. Apparatus as in claim 14, wherein:

said tape has a tension on the order of a thousand pounds per square inch.

25. In apparatus for winding tape having opposite edges into an increasing tape pack about a hub of a tape reel having an axis of rotation, the improvement comprising in combination:

flexible reel flanges on opposite sides of said hub;

an interwinding fluid film former coupled to said tape and through substantially each newly arriving winding of said tape for a number of turns at said tape pack;

a reel flange spreader where said tape enters said reel during said winding;

a tape edge aligner at substantially each of said newly arriving windings of said tape and fluid film formed at said increasing tape pack; and a tape winding locker coupled to each leading turn of said number of turns;

wherein said tape edge aligner and tape winding locker include said flexible reel flanges and a continuous reel flange flexer coupled to said flexible reel flanges.

26. Apparatus as in claim 25, wherein:

said flexible reel flanges have different spacings at their circumferences than at said hub.

27. Apparatus as in claim 25, wherein:

said flexible reel flanges are further apart at their peripheries than at said hub.

28. Apparatus as in claim 25, wherein:

said flexible reel flanges are conical.

29. Apparatus as in claim 25, wherein:

said tape edge aligner includes the reel flange spreader where said tape enters said reel during said winding.

30. Apparatus as in claim 25, wherein:

said aligner includes an alignment force imposer acting through said flanges on substantially each of said newly arriving windings in parallel to said fluid film.

31. Apparatus as in claim 25, wherein:

said aligner includes a pressure differential generator acting through said flanges on substantially each of said newly arriving windings in parallel to said fluid film.

32. Apparatus as in claim 25, wherein:

said aligner includes an overpressure generator acting through said flanges substantially each of said newly arriving windings in parallel to said fluid film.

33. A pack of wound tape having perfectly co-planar tape edges at opposite radial sides of said pack, produced by a method comprising in combination:

winding tape having opposite edges into an increasing tape pack about an axis of rotation at tape speeds in excess of three meters per second, wherein the tape enters the tape pack through a reel flange spreader during said winding;

floating substantially each newly arriving winding of said tape on a fluid film on said increasing tape pack; and continuously aligning opposite edges of substantially each new winding of said tape for a number of turns with corresponding edges of substantially all preceding windings of tape in said increasing tape pack with the aid of said fluid film, while gradually diminishing increments of said fluid film between said turns to zero until each leading turn of said number of turns has become locked to a remainder of the tape pack.

34. A pack of wound tape produced by a method as in claim 33, wherein:

said aligning of said opposite edges includes imposing on said tape a force substantially parallel to said fluid film at substantially each newly arriving winding for said number of turns.

35. A pack of wound tape produced by a method as in claim 34, wherein:

said force is imposed with the aid of a pressure differential at said tape.

36. A pack of wound tape produced by a method as in claim 34, wherein:

said force is imposed with the aid of an overpressure at said tape.

37. A pack of wound tape produced by a method as in claim 33, wherein:

said aligning of said opposite edges includes tape edge guiding said tape at substantially zero relative motion between tape edge guide and tape at substantially each of said newly arriving winding for said number of turns.

38. A pack of wound tape produced by a method as in claim 37, wherein:

said tape edge guide is rotated with rotation of said tape during said winding.

39. A pack of wound tape produced by a method as in claim 37, wherein:

said tape edge guide is rotated toward and away from said tape.

40. A pack of wound tape produced by a method as in claim 33, wherein:

said tape is wound on a hub of a tape reel having flanges at opposite sides of said hub; and said opposite edges are continuously aligned with the aid of said flanges.

41. A pack of wound tape produced by a method as in claim 40, wherein:

said flanges are continuously flexed onto said opposite edges beginning with substantially each newly arriving winding.

42. A pack of wound tape produced by a method as in claim 40, wherein:

said flanges contact said tape only where there is substantially no relative motion between said flanges and said tape.

43. A pack of wound tape produced by a method as in claim 40, wherein:

said flanges are continuously flexed apart where said tape enters said reel during said winding.

44. A pack of wound tape produced by a method as in claim 40, wherein:

said floating of substantially each newly arriving winding of said tape and the continuous diminution of each fluid film increment is effected by tension control of the winding tape.

45. A pack of wound tape produced by a method as in claim 33, wherein:

said tape is wound at a tension on the order of a thousand pounds per square inch.

* * * * *